（12）United States Patent
Smith

(10) Patent No.: US 6,774,796 B2
(45) Date of Patent: Aug. 10, 2004

(54) MASTER AUTHENTICATOR

(75) Inventor: Edwin Derek Smith, Fort Lauderdale, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/920,024

(22) Filed: Aug. 1, 2001

(65) Prior Publication Data

US 2003/0025603 A1 Feb. 6, 2003

(51) Int. Cl.$^7$ .............................................. G08B 23/00
(52) U.S. Cl. ............................ 340/573.1; 340/573.3; 340/573.4; 340/686.1; 340/686.6
(58) Field of Search .................... 340/573.1, 573.3, 340/573.4, 686.1, 686.6, 5.8, 5.81, 5.85, 568.1, 568.2, 568.4, 571, 539, 572.8, 572.9, 5.64

(56) References Cited

U.S. PATENT DOCUMENTS

| | | | | |
|---|---|---|---|---|
| 3,478,344 A | * | 11/1969 | Schwitzgebel | 340/539 |
| 4,450,843 A | * | 5/1984 | Barney et al. | 600/503 |
| 5,617,074 A | * | 4/1997 | White | 340/573.1 |
| 5,640,147 A | * | 6/1997 | Chek et al. | 340/573.1 |
| 5,729,590 A | * | 3/1998 | Dimitriadis et al. | 340/825.44 |
| 5,926,103 A | * | 7/1999 | Petite | 340/825.19 |
| 5,995,007 A | * | 11/1999 | Borja et al. | 340/573.4 |
| 6,219,694 B1 | | 4/2001 | Lazaridis et al. | |
| 6,239,700 B1 | * | 5/2001 | Hoffman et al. | 340/539 |
| 6,262,660 B1 | * | 7/2001 | Segale et al. | 340/539 |

* cited by examiner

*Primary Examiner*—Jeffery Hofsass
*Assistant Examiner*—Daniel Previl
(74) *Attorney, Agent, or Firm*—Randi L. Karpinia

(57) ABSTRACT

A master authenticator (10) is worn by a user and wirelessly transmits information associated with the user to a remotely located electronic device. The master authenticator contains a sensor (12) to determine or sense whether or not the user is wearing the authenticator, along with a means to allow the user to log (22) in to the master authenticator by performing predefined physical action on the master authenticator. Once the sensor senses that the user is physically coupled to or wearing the device, the user logs in so as to uniquely associate the master authenticator with the user. Once the user is logged in, a transmitter is enabled so that the information can be transmitted to an electronic device in the proximity of the user. When the user ceases to wear the master authenticator by removing it, the log in means de-authorizes further transmissions by the master authenticator due to action of the sensor sensing that the authenticator is no longer on the user.

25 Claims, 1 Drawing Sheet

MASTER AUTHENTICATOR

TECHNICAL FIELD

This invention relates in general to wireless communications, and more particularly, to a secure method of wirelessly communicating personal information to remote electronic devices.

BACKGROUND

Networked and stand alone electronic devices that contain or transmit confidential or sensitive information typically require some form of user authentication in order to protect the information from prying eyes and nefarious individuals. Some of the most common methods of authentication are: a secret username and/or password, a unique physical object (electronic key, secure id card, magnetic stripe card, smartcard, etc.), direct physical attributes (facial recognition, fingerprint scan, retinal scan, voice print, signature characteristics, etc.), or some combination of these techniques. The sheer number of approaches to solving this problem attests to the lack of an optimum solution. Some of these problems with each of these prior art methods are: passwords can be forgotten, passwords can be compromised if written down, physical objects can be lost or unavailable when needed, and readers capable of reading biological formats are expensive. The result of society's continued proliferation of authentication systems is that many users are faced with the task of tracking multiple accounts and passwords. It is not at all unusual for an individual in the year 2001 to have 50–75 users names and/or passwords to track. Another problem is that a user may log on to a system such as a desktop computer and then walk away without locking or logging out, thus compromising the intended security. Clearly, a better way of protecting sensitive information is needed.

DETAILED DESCRIPTION OF THE PREFERRED EMBODIMENT

The present invention addresses the problems of prior art methods of authentication with a physical device that is worn by the user in intimate proximity to the body. A master authenticator is worn by a user and wirelessly transmits information associated with the user to a remotely located electronic device. The master authenticator contains a sensor to determine or sense whether or not the user is wearing the authenticator, along with a means to allow the user to log in to the master authenticator by performing predefined physical action on the master authenticator. Once the sensor senses that the user is physically coupled to or wearing the device, the user logs in so as to uniquely associate the master authenticator with the user. Once the user is logged in, a transmitter is enabled so that the information can be transmitted to an electronic device in the proximity of the user. When the user ceases to wear the master authenticator by removing it, the log in means de-authorizes further transmissions by the master authenticator due to action of the sensor sensing that the authenticator is no longer on the user.

Figure 1:
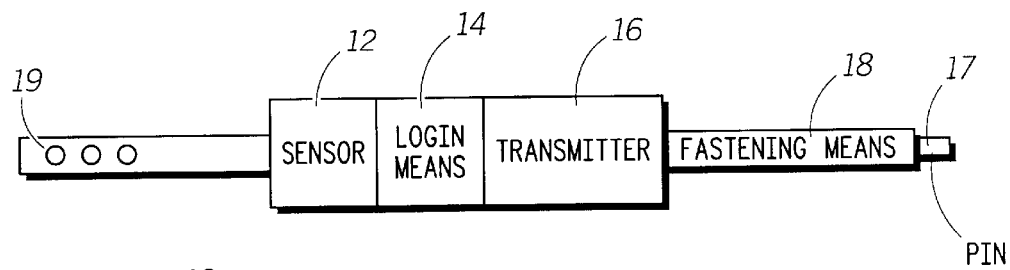
FIG. 1 is a schematic representation of one embodiment of a master authenticator in accordance with the invention.
Figure 2:
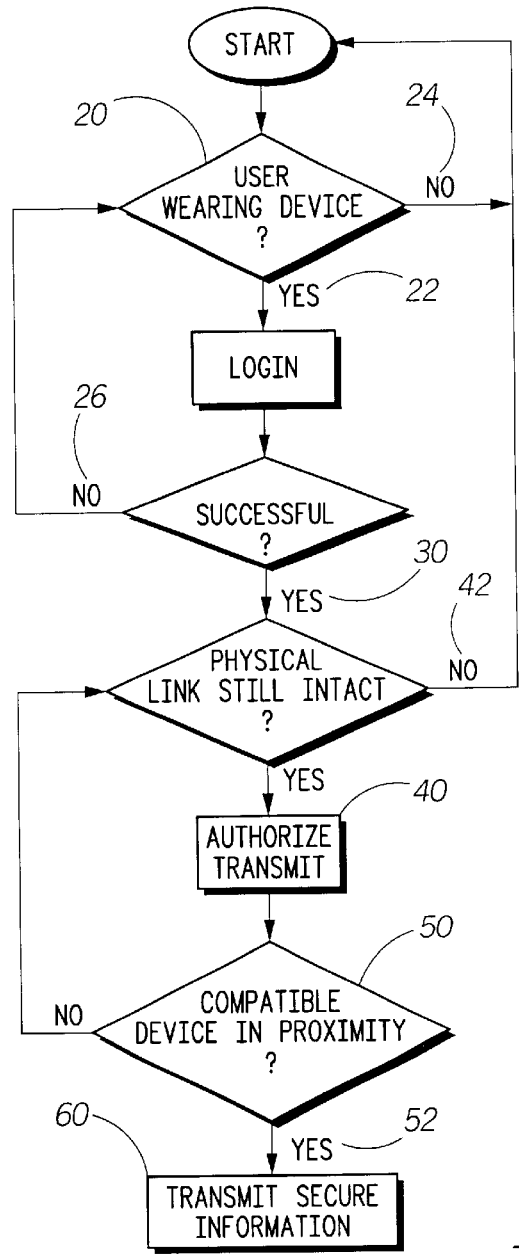
FIG. 2 is a flow sheet depicting in schematic format the various steps involved in the use of the master authenticator in accordance with the invention.

While the specification concludes with claims defining the features of the invention that are regarded as novel, it is believed that the invention will be better understood from a consideration of the following description in conjunction with the drawing figures, in which like reference numerals are carried forward. Referring now to FIGS. 1 and 2, a device known herein as a "master authenticator" 10 is worn by a user and wirelessly transmits information associated with the user to a remotely located electronic device. The master authenticator contains a sensor 12 to determine or sense whether or not the user is wearing the authenticator. In one embodiment of the invention, the master authenticator is a wristband or bracelet similar to a wristwatch, and contains fastening means 18 such as a band or belt, and a clasp or buckle that holds the band in place by inserting a pin 17 and a hole 19. If the sensor 12 indicates that the user is properly wearing 20 the device, then the user is permitted to log in 22. If the sensor does not indicate 24 that the user is wearing the device, then log in is denied or not permitted 26. The user is logged into the authenticator 10 through some physical action which takes place on the authenticator or remotely. The user either performs the log in or the log in is performed on the user's behalf by another. As explained above, the log in means 14 is responsive to the sensor, such that the log in cannot be accomplished unless the sensor indicates that the user is properly wearing the authenticator. The log in activity is a physical action, such as entering a password, speaking a word or phrase, pushing a button or series of buttons in a predetermined manner, twisting a bezel on a watch face, etc. In the case of logging in remotely, one can log in via radio or via a wireless device such as a Palm organizer that is linked to the authenticator. Normally, one would consider that the user is a human, and the human enters the password himself. However, I envision that my invention can be used with animals such as household pets, livestock, or laboratory animals. In these cases, the log in would be accomplished on animal's behalf, by an appropriate or authorized human representative. For example, an ear tag can be placed on a cow or sheep, or a collar can be placed on a cat or dog, and when the sensor indicates that the tag or collar is in place, the human owner of the pet enters the appropriate log in credentials. By having a log in step that comprises a physical activity that is unique to or known only by the user or the user's representative, the user is uniquely associated with the master authenticator.

The master authenticator 10 also contains a transmitter 16 for wirelessly transmitting information associated with the user to an electronic device that is in the vicinity of the user. By 'in the vicinity' or 'in the proximity of' I mean within the range of 5–100 feet of the master authenticator. My invention is not intended to be a wide ranging or long distance device, but is intended to communicate with other devices in the sphere of the user's personal space. It will be appreciated by those of ordinary skill in the art that the transmitter 16, for example, can utilize infrared communication, radio frequency communication, or the like. The transmitter 16 is typically a device that generates and amplifies a radio frequency carrier signal, modulates the carrier with intelligence, and radiates the modulated radio frequency carrier into space. The transmitter can also comprise a transponder, that is, a radio transmitter-receiver which transmits identifiable signals automatically when the proper interrogation is received. Transponder are passive (i.e. without a battery) read/write radio frequency identification devices used in a wide variety of data collection and identification applications. User programmable data may be read from the authenticator with a typical read range of up to 1 meter from a standard antenna. The transponder is normally in a quiescent state, but when it enters a 125 KHz field produced by an interrogating antenna, an onboard capacitor is charged, enabling the tag to transmit its data back to the antenna. The authenticator utilizes low frequency inductive coupling and can therefore function through most non-conducting materials, allowing operation in very difficult or harsh environments. Since it has no need for a battery, a life of ten years and beyond can be expected. Once successful log in has been accomplished 30, the transmitter is authorized 40 by the log in means 14 to transmit the information. However, if the sensor 12 at any time indicates that the physical link to the user is no longer intact 42, then transmission is de-enabled and the routine must be begun from the beginning. After transmission is authorized 40, the device monitors the area immediately surrounding the user to determine whether a compatible electronic device capable of receiving the transmitted information is present. If the device is present 52, then the information is transmitted 60. "Logging out" is an automated process, as it occurs upon removal of the device from the user, and is activated by the sensor. The user could also force a log-off using manual over-ride of the system. The master authenticator 10 acts as a personal agent, performing authentication functions on behalf of the user.

One embodiment of a master authenticator is in the form factor of a wristwatch. Sensors on the back face sense the user's skin (thermal, skin contact resistance, optical, or other physical mechanism) and trigger authentication. When the skin is no longer sensed, it is assumed that the master authenticator has been removed and the user is logged out. The automated nature of the log out action is important for improving effective security, as it does not rely upon the user's memory or reason, one or more of which is often fallible. Alternatively, a circuit can be incorporated into the band itself to determine when the device is being worn. A significant benefit of a watch worn on the wrist is rapid access to displayed information without encumbering the user's hands. This is a compelling attribute and can be leveraged in a personal area network (PAN). The master authenticator functionality becomes a subsystem of such a network, yet integral to its functionality. Information could not be displayed to a device that wasn't authenticated and "logged on". The watch would be a primary interface point for the user's PAN.

The master authenticator communicates with other devices using open standards so as to foster wide adoption of this capability. In addition, existing technology such as smart-cards and java buttons can be used such that the master authenticator will be compatible with a large number of existing devices. It is also expected that Bluetooth local wireless interfaces will be commonly used, as they are small and require very little power. A local wireless environment would provide the greatest operational flexibility and could therefore be designed to work seamlessly for the user. Local wireless will also allow for widespread adoption due to standardized interfaces and compelling applications. A wireless architecture would allow for additional usage modes and interactivity.

In additional to authentication, the master authenticator can also be used as a signature mechanism for final approval of a transaction. The user is prompted through the master authenticator with a selection to approve or reject the transaction. Transactions would include traditional financial exchanges, legal agreements, information exchange and the like.

To further aid the reader in understanding my invention, I present several scenarios where the master authenticator can be employed. In a mobile environment, the master authenticator serves as a flexible component in a user's personal area network that is recognized and utilized if available to the system. For example, it is expected that personal digital assistants (PDA) such as Palm devices will incorporate local wireless technology, so one scenario might be for a second party to request an electronic business card to be transferred from your PDA to theirs. An application on the PDA would send this request to a small display on the master authenticator and alert the user in some fashion. Following the user input, the response is relayed back to their PDA and the transaction with the second party PDA either proceeds or terminates depending upon the user's decision. In a local wireless environment, this would eliminate the need for the user to physically interact with the PDA, thus simplifying the process. If the PDA uses the Bluetooth protocol, a software application resides on the PDA that is tied to the security functionality. When attempting to power on the PDA, it first sends out via the Bluetooth link, a query to determine if the master authenticator in its database is present (within Bluetooth range) and "logged on". If so, the PDA continues uninterrupted and the user may not even be notified that this check occurred. If desired, an event could be written to a log on the PDA, a notice sent to the display of the master authenticator, or some other indication provided (beep, etc.). If the PDA does not find a valid master authenticator present, then the PDA continues with a log-on routine that the user must complete before accessing the device. Such a system provides excellent security, yet does not require effort or time from the user for it to operate, thus improving the both the user experience and quality of security.

Similar to the previous example, a cellular telephone is used instead of the PDA to display an incoming number or identity. The master authenticator beeps to alert the user of the call. The user could accept or reject the call through the master authenticator, simplifying the task for the user. One may want to do this when in a car, for example, where there is a hands-free kit, or while wearing a wireless headset. The master authenticator acts as an alternate interface to the phone.

A desktop computer enabled with Bluetooth can work in a similar fashion. One difference is that the computer may be networked or set up for a variety of users (which is less typical for PDA's). There is a possibility that more than one master authenticator is within the local wireless range of the computer, and that more than one of the master authenticators has a corresponding account on the computer. This requires that a user be selected on the computer, and then that the associated master authenticator prompts its user for access approval. Again, a software application designed to work in concert with the master authenticator would reside on the computer.

A Bluetooth enabled home security system could automatically be deactivated upon entry to the home if the master authenticator is present and logged in for a user authorized to disable the alarm. This requires that the user simply enter the home as normal, with all alarm disabling done in the background, transparent to the user. Additionally, when turning on the alarm when leaving, the master authenticator could be used to verify that the person has privileges for turning on the alarm. A similar scenario might be used for an office environment.

The master authenticator could work with an automobile in a fashion similar to a keyless entry system. Additionally, more than one person could access the vehicle, and a log maintained. Time windows could be established during which a particular master authenticator is valid, a useful feature for car rental services.

In summary, the master authenticator functions as a gateway. An authenticator is personal, wearable, small, networked, connected, simple, always-on, low power, secure, simple, and easy to access. When the master authenticator is donned, an authentication procedure is initiated, and the user is actively "logged in" by, for example, pressing a series of buttons, by turning a bezel (like a combination lock), using a fingerprint recognition or other biometric technology, or through some other established method.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. For example, the master authenticator could incorporate a receiver instead of a transmitter, and receive information from an electronic device in the proximity of the user only when the user is properly logged in as described above.

What is claimed is:

1. A master authenticator, wearable by a plurality of users, for wireless transmission of information associated with each user, comprising:
    a sensor for automatically sensing whether one of the plurality of users is wearing the master authenticator;
    a log in means, functioning in response to the sensor sensing that one of the plurality of users is wearing the master authenticator, wherein the log in means uniquely identifies each user, and further wherein the log in means uniquely verifies authorization for the master authenticator to transmit the information associated with the user wearing the master authenticator, thereby providing an authorized user when the authorization verification is successful; and
    a transmitting means, responsive to the log in means, for wirelessly transmitting the information associated with the authorized user to an electronic device in the proximity of the master authenticator, wherein the information comprises an authentication for the authorized user to perform one or more operations utilizing the electronic device.

2. The master authenticator as described in claim 1, wherein the log in means comprises a predefined physical action performed on the master authenticator.

3. The master authenticator as described in claim 2, wherein the user performs the predefined physical action remote from the master authenticator.

4. The master authenticator as described in claim 1, wherein the log in means de-authorizes the master authenticator when a second predefined physical action is performed on the master authenticator by the user.

5. The master authenticator as described in claim 1, wherein in response to the sensor sensing that the authorized user is no longer wearing the master authenticator, the log in means de-authorizes the authorized user, wherein the transmitter communicates the de-authorization to the electronic device, and further wherein the authorized user can no longer perform the one or more operations utilizing the electronic device in response to the de-authorizing.

6. The master authenticator as described in claim 1, wherein the transmitting means is infrared.

7. The master authenticator as described in claim 1, wherein the transmitting means is radio frequency.

8. The master authenticator as described in claim 1, wherein the master authenticator comprises a transponder.

9. The master authenticator as described in claim 1, wherein the sensor comprises a skin sensor.

10. The master authenticator as described in claim 1, wherein the master authenticator comprises a wristband.

11. The master authenticator as described in claim 1, wherein the user is a human user.

12. The master authenticator as described in claim 1, wherein the user is an animal.

13. A master authenticator, wearable by a plurality of users, for wireless transmission of information associated with each user, comprising:
    a sensor for automatically sensing whether one of the plurality of users is wearing the master authenticator;
    a log in means functioning in response to the sensor sensing that one of the plurality of users is wearing the master authenticator, wherein the log in means uniquely identifies each user, and further wherein the log in means uniquely verifies authorization for the master authenticator to transmit the information associated with the user wearing the master authenticator, thereby providing an authorized user when the authorization is successful;
    a transmitting means for wirelessly transmitting the information associated with the user to an electronic device in the proximity of the master authenticator, wherein the information comprises an authentication for the authorized user to perform one or more operations utilizing the electronic device; and
    a locking means, responsive to the sensor and the log in means, for preventing the transmitting means from transmitting the information when the authorization verification by the log in means is not successful.

14. The master authenticator as described in claim 13, wherein the receiving means is infrared.

15. The master authenticator as described in claim 13, wherein the receiving means is radio frequency.

16. The master authenticator as described in claim 13, wherein the receiving means is a transponder.

17. A master authenticator, wearable by a plurality of human users, for wireless transmission of information associated with each user, comprising:
    a skin sensor for automatically sensing whether one of the plurality of human users is wearing the master authenticator;
    a log in means, functioning in response to the sensor sensing that one of the plurality of human users is wearing the master authenticator, whereby a physical action performed on the master authenticator by the user uniquely identifies the master authenticator with the user, and further wherein the log in means uniquely verifies authorization by the user for the master authenticator to transmit the information associated with the user wearing the master authenticator, thereby providing an authorized user when the authorization is successful;
    a transponder, responsive to the log in means, for wirelessly transmitting the information associated with the authorized user to an electronic device in the proximity of the master authenticator, wherein the information comprises an authentication for the authorized user to perform one or more operations utilizing the electronic device; and
    a locking means, responsive to the sensor and the log in means, for preventing the transponder from transmitting the information associated with the user wearing the master authenticator when the authorization verification by the log in means is not successful.

18. A master authenticator, wearable by a plurality of users, for wireless reception of information associated with each user, comprising:
   a sensor for automatically sensing whether one of the plurality of users is wearing the master authenticator;
   a log in means, functioning in response to the sensor sensing that one of the plurality of users is wearing the master authenticator, whereby a physical action performed on the master authenticator by each user uniquely verifies authorization of the user performing the physical action and wearing the master authenticator to receive transaction requests using the master authenticator, thereby providing an authorized user when the authorization verification is successful;
   a receiving means, responsive to the log in means, for wirelessly receiving a transaction request associated with the authorized user from an electronic device in the proximity of the authorized user; and
   a transmitting means, responsive to receiving the transaction request, for wirelessly transmitting one or more information associated with the authorized user to the electronic device, wherein the information comprises an authorization of the transaction request for the electronic device.

19. A method of authenticating, comprising:
   providing a master authenticator wearable by a user, wherein the user actively logs in to the master authenticator by performing a physical action such that the master authenticator becomes uniquely identified with the user;
   providing a wireless electronic device for performing one or more operations, and capable of communicating with the master authenticator;
   authenticating the user by:
      sensing that the master authenticator is physically attached to the user, and
      uniquely identifying the user using a log in means;
   transmitting information associated with the authenticated user from the master authenticator to the wireless electronic device in response to the device being in proximity to the master authenticator and further in response to the authorization verification,
   authenticating the user within the wireless electronic device using the transmitted information; and
   performing one or more operations within the wireless electronic device in response to the authentication.

20. The method of authenticating as described in claim 19, wherein the information is transmitted from the wireless electronic device to the master authenticator by signals in the infrared region of the electromagnetic spectrum.

21. The method of authenticating as described in claim 19, wherein the information is transmitted from the wireless electronic device to the master authenticator by signals in the radio frequency region of the electromagnetic spectrum.

22. The method of authenticating as described in claim 19, wherein the step of authenticating further comprises attaching a wristband to the user.

23. The method of authenticating as described in claim 19, wherein the master authenticator further comprises a sensor, and further wherein the step of sensing comprises sensing the presence or absence of the user's skin.

24. The method of authenticating as described in claim 19, further comprising a final step of de-authenticating the user by:
   physically removing the master authenticator from the user so as to disable the master authenticator from transmitting or receiving information from the wireless electronic device; and
   de-authorizing the authorized user from performing operations within the electronic device.

25. A method of authenticating, comprising:
   providing a master authenticator wearable by a user, wherein the user actively logs in to the master authenticator by performing a physical action such that the master authenticator becomes uniquely identified with the user;
   providing a wireless electronic device capable of communicating with the master authenticator;
   authenticating the user by:
      physically attaching the master authenticator to the user, and
      uniquely identifying the user using a log in means;
   transmitting a transaction request associated with the authenticated user from the wireless electronic device to the master authenticator in response to the device being in proximity to the authenticated user and further in response to the authorization verification;
   transmitting one or more information associated with the authorized user from the master authenticator to the wireless electronic device: and
   authorizing the transaction request using the one or more information within the wireless electronic device.

* * * * *